March 10, 1964 W. J. HOMAN 3,124,803
MAGNETIC TRANSDUCER
Filed Sept. 20, 1960

INVENTOR.
WILLIAM J. HOMAN
BY Robert B. Crouch
ATTORNEY 3,124,803
Patented Mar. 10, 1964

3,124,803

MAGNETIC TRANSDUCER

William J. Homan, San Jose, Calif., assignor to International Business Machines Corporation, New York, N.Y., a corporation of New York Filed Sept. 20, 1960, Ser. No. 57,343
3 Claims. (Cl. 346—74)

The present invention relates to magnetic transducers and more particularly to magnetic transducers for use with disc-type magnetic memories or data storage devices.

In a disc-type magnetic memory, a number of flat, circular recording discs are assembled in parallel relation for rotation about a common axis. In such a device, a large percentage of the overall height of the memory is allocated to the spacing between the discs. Obviously, material reduction in disc spacing would provide improved space utilization and a more compact memory. However, the disc spacing in the usual disc-type memory is determined by the thickness or height of the magnetic read/write transducer to be introduced between the discs. In conventional ring-type transducers, wherein the ring is positioned normal to the plane of the recording disc, the diameter of the ring (which determines the height of the transducer) can be reduced but a limited amount before the coil is brought into such close proximity with the recording gap as to interfere with the read characteristics of the transducer. This has resulted in a relatively large minimum size for ring-type transducers which has necessitated a consequent large disc spacing for disc-type magnetic memories. The product of this limitation in transducer construction has been rather bulky memories with consequent large movements necessary for transducer travel between discs. The relatively large size and consequent mass of conventional ring-type transducers has also produced an adverse effect on the speed with which a transducer can be positioned from one disc to another or from one position on a disc to a second position on the same disc. It is thus apparent that conventional transducer constructions have seriously limited the efficiency of disc-type magnetic memories, both from the standpoint of speed of operation and overall space requirements.

The object of the present invention is to provide a magnetic transducer having an exceedingly low overall height and low mass and one which is capable of being mass produced at minimum cost.

The above object is realized in the present invention by the provision of a magnetic transducer made up of a plurality of narrow strips of high permeability material arranged in overlapping relation to define a ring structure. A recording gap is formed below (or above) the plane of the ring structure between the distal ends of tabs which extend laterally from the strips. The height of the transducer is determined by the width of the strip and the length of its associated tab. The strips of each transducer are similar and can all be punched and shaped with the same dies.

Other objects and many of the attendant advantages of this invention will be readily appreciated as the same becomes better understood by reference to the following detailed description of preferred embodiments of the invention, as illustrated in the accompanying drawings wherein:

In the drawings—

Figure 1:
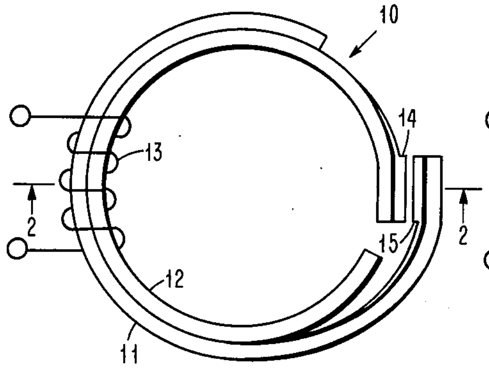
FIG. 1 is a plan view of a first embodiment of the present invention.
Figure 2:
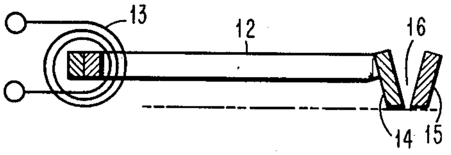
FIG. 2 is an elevation view partly in section taken along lines 2—2 of FIG. 1.

Referring more particularly to FIG. 1, the transducer of the present invention consists of a ring structure 10 made up of a plurality of strips 11, 12 of material having high permeability and good flux carrying characteristics. The strips are formed in a circular configuration and are disposed a concentric relation. A coil 13 is wound around the ring such that the loops of the coil encompass both of the strips 11 and 12. Tabs 14, 15 are provided adjacent one end of each strip and are aligned in overlapping fashion at a point diametrically opposite from the coil 13. As shown in FIG. 2, the tabs extend laterally from the body of the strip and are canted to be convergent away from the strip. The distal ends of the tabs 14 and 15 form the pole pieces of the transducer and a wedge-shaped air gap is provided between the tabs with the narrowest section of the gap located between the distal ends. The wedge shaped air gap creates an intense magnetic flux field between the pole pieces formed by the distal ends of the tabs, while limiting the flux leakage between the sides of the gap formed by the remainder of the tabs.

Figure 3:
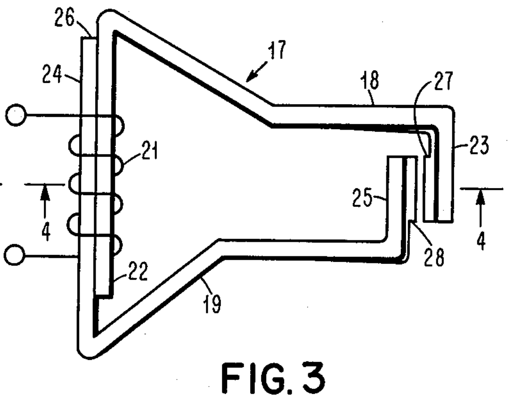
FIG. 3 is a plan view of a second embodiment of the present invention.
Figure 4:
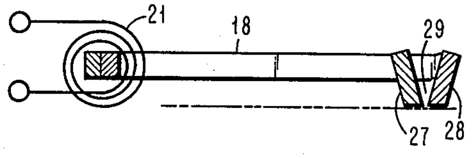
FIG. 4 is an elevation view partly in section taken along lines 4—4 of FIG. 3.

In the embodiment illustrated in FIGS. 3 and 4, the ring structure includes sheet metal strips 18, 19 and a coil 21. In this embodiment, the ends 22, 23 and 24, 25 of the strips form legs which are displaced to one side of the body of the attached strip which may be formed in a desired geometrical shape. The ends are straight and are positioned in overlapping fashion with legs 22 and 24 secured together by a suitable flux-conducting material, such as a ferrite cement, spot welding, etc. Legs 23 and 25 are positioned in such a fashion that tabs 27, 28 carried thereby are aligned in overlapping relation. As in the earlier embodiment, tabs 27 and 28 extend laterally of the strips and converge to form a wedge-shaped air gap.

The present construction produces a transducer with well defined pole tips which result in very good signal resolution characteristics. The construction of the present invention lends itself readily to combinations of transducers for read/write/erase purposes. When so used, the recording gaps of adjacent transducers can be spaced as closely as desired without causing transformer action between the coils of the adjacent transducers. In such installations, the width of the tabs can be varied to write/read/erase, either wide or narrow, as desired.

Figure 5:
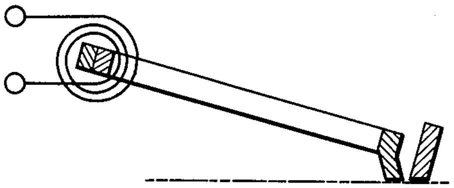
FIG. 5 is an elevation view partly in section of a transducer which has been slightly modified to space the coil from the recording surface.
Figure 6:
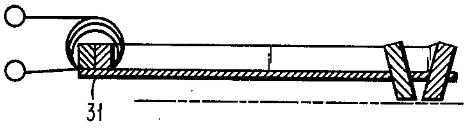
FIG. 6 is an elevation view partly in section of a transducer incorporating a shield.

FIGS. 5 and 6 illustrate modifications applicable to either of the embodiments described above. In FIG. 5 the ring structure is positioned at an angle to the recording surface to space the coil away from the surface and reduce the possibility of undesired erasure. In FIG. 6, a similar result is obtained by the use of a shield 31 of mu metal, or similar material, which covers the lower surface of the ring structure.

In constructing the present transducer the strips may be either sheared or stamped from sheet material, such as mu metal, the strips are then pre-shaped to whatever shape is dictated by the installation, and then annealed. The strips are then assembled to form a ring structure in the manner indicated above and the coil is wound on the ring. The strips are assembled with the distal ends of the tabs in contact. This juncture can then be lapped to produce a recording gap of the desired width. By this process, transducers with pole tips of 1 mil thickness and recording gaps of .3 mil width can be easily produced.

All the strips for either embodiment illustrated can be stamped with a single die, and if alternate strips are reversed, all the strips can be pre-shaped in a common shaping die.

If it is desired to construct the present transducer from non-metallic materials, the strips can be molded from ferric oxide. Tabs of mu metal are then attached to the strip by ferrite cement, and the strips assembled as described above.

Obviously, many modifications and variations of the present invention are possible in the light of the above teachings. It is therefore to be understood that within the scope of the appended claims, the invention may be practiced otherwise than as specifically described.

What is claimed is:

1. A magnetic transducer comprising a closed figure having a recording gap offset from the plane thereof, the overall height of the transducer being only a fraction of the diameter of the closed figure, the figure being formed by a plurality of elongated strips, each strip having a laterally extending tab adjacent one end, both ends of each strip being displaced to one side of the central portion thereof, the strips being arranged in pairs with at least the ends of each strip overlapping those of the other strip, the tabs of each pair being positioned adjacent each other in convergent relation to form a recording gap.

2. A magnetic transducer comprising a ring structure having a recording gap offset from the plane thereof, the overall height of the transducer being only a fraction of the diameter of the ring structure, the ring being formed from a plurality of sheet metal strips arranged in partial overlapping relation, each strip having a laterally extending tab adjacent one end, the tabs of adjacent strips being aligned in overlapping relation on a common radius of the ring, the tabs converging away from the plane of the ring to form the air gap between their extremities.

3. A magnetic transducer comprising a ring structure having an air gap offset from the plane of the ring and a coil spaced from the air gap, the overall height of the transducer being only a fraction of the diameter of the ring structure, said ring being formed of a plurality of sheet metal strips arranged in partial overlapping relation, each strip having a laterally extending tab adjacent one end, the tabs of adjacent strips being aligned in overlapping relation on a common radius of the ring, the tabs converging away from the plane of the ring to define an air gap between their free extremities, the longitudinal axis of the air gap being normal to the common radius through the tabs, and a coil wound on the overlapped strips at a point diametrically removed from the tabs.

References Cited in the file of this patent

UNITED STATES PATENTS 2,806,904 Atkinson et al. ---------- Sept. 17, 1957
2,850,582 De Raemy ------------- Sept. 2, 1958